(12) United States Patent
Tsai

(10) Patent No.: US 7,832,517 B2
(45) Date of Patent: Nov. 16, 2010

(54) FOLDING ELECTRIC BICYCLE WITH WHEELED STORAGE ARRANGEMENT

(76) Inventor: Fu-Hsun Tsai, No. 74, Guoguang 8th Street, Yongkang, Tainan (TW)

( * ) Notice: Subject to any disclaimer, the term of this patent is extended or adjusted under 35 U.S.C. 154(b) by 190 days.

(21) Appl. No.: 12/254,011

(22) Filed: Oct. 20, 2008

(65) Prior Publication Data
US 2010/0096827 A1   Apr. 22, 2010

(51) Int. Cl.
*B62K 15/00* (2006.01)
(52) U.S. Cl. .................. 180/220; 180/205; 280/287
(58) Field of Classification Search .............. 180/219, 180/220, 205, 206, 207; 280/278, 287
See application file for complete search history.

(56) References Cited

U.S. PATENT DOCUMENTS

| | | | | |
|---|---|---|---|---|
| 4,094,374 A | * | 6/1978 | Adams | 180/208 |
| 6,273,442 B1 | * | 8/2001 | Fallon et al. | 280/287 |
| 6,457,544 B1 | * | 10/2002 | Sung | 180/220 |
| 7,077,229 B2 | * | 7/2006 | Lee | 180/220 |
| 7,461,715 B1 | * | 12/2008 | Tsai | 180/208 |

* cited by examiner

*Primary Examiner*—Kevin Hurley

(57) ABSTRACT

A folding electric bicycle in one embodiment includes a front case comprising a door and two auxiliary wheels; a pivotal head tube; two handlebars; a swivel fork telescopically connected to the head tube; a front wheel; a drive mechanism comprising a folding frame, a front chain wheel, two pedals, a rear bracket, a rear wheel, first and second rear chain wheels, and a main drive chain rotatably fitted around the front chain wheel and the first rear chain wheel; a detachable seat assembly; a battery pack; an electric motor for rotating the rear wheel; and a driven wheel interconnecting the electric motor and the second rear chain wheel. For collapsing the bicycle, a driver detaches the seat assembly, folds the frame, places the frame, the seat assembly, and the rear wheel in the case, partially disposes the front wheel in the case, and closes the door.

7 Claims, 5 Drawing Sheets

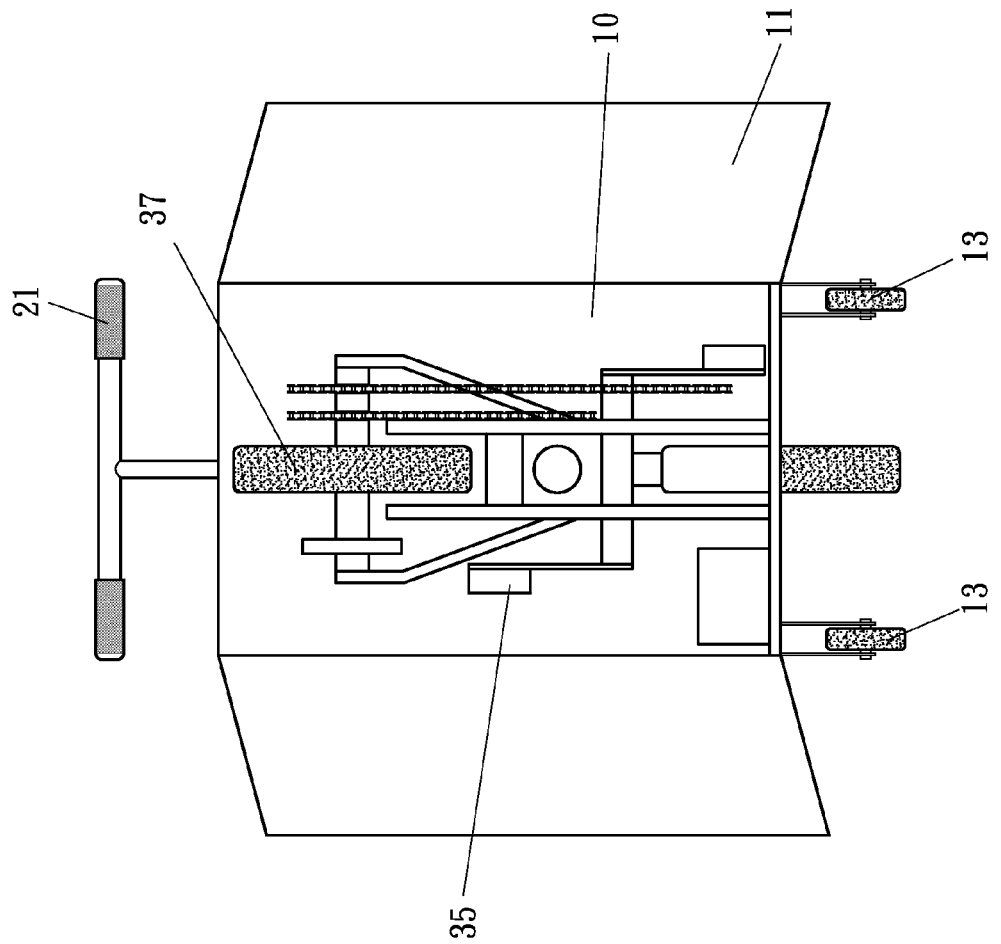
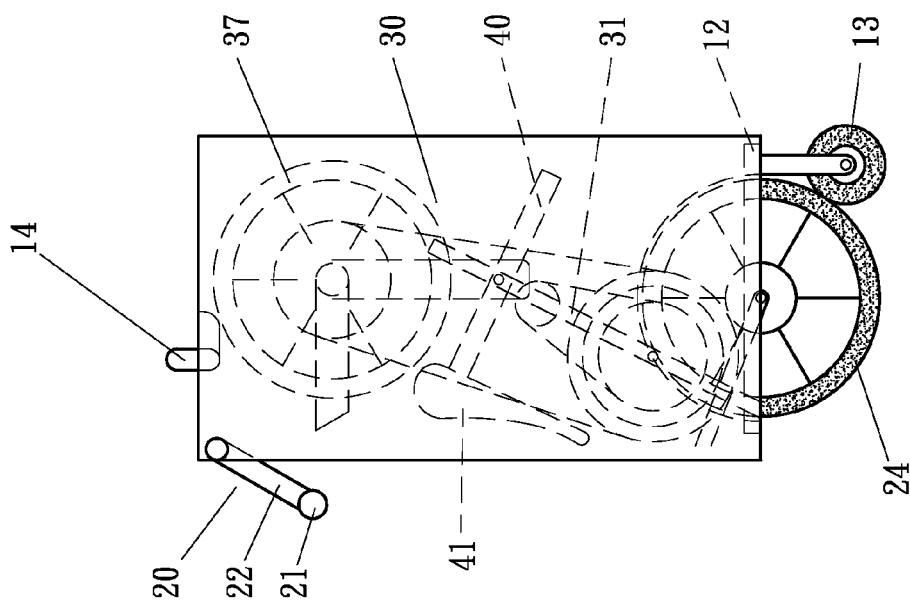

FOLDING ELECTRIC BICYCLE WITH WHEELED STORAGE ARRANGEMENT

BACKGROUND OF THE INVENTION

1. Field of Invention

The invention relates to folding electric bicycles and more particularly to a folding electric bicycle having a wheeled storage arrangement which is adapted to store the folded electric bicycle and move by wheeling for saving labor.

2. Description of Related Art

Electric bicycles are becoming increasingly popular throughout the world. There is also a type of folding electric bicycle on the market. However, it is laborious for a driver to carry a folded electric bicycle because electric bicycles are heavier than typical bicycles due to the additional weight of electric motor, battery pack, and associated components. Thus, the need for improvement still exists.

SUMMARY OF THE INVENTION

It is therefore one object of the invention to provide a folding electric bicycle having a wheeled storage arrangement which is adapted to store the folded electric bicycle and move by wheeling for saving labor.

The above and other objects, features and advantages of the invention will become apparent from the following detailed description taken with the accompanying drawings.

BRIEF DESCRIPTION OF THE DRAWINGS

FIG. 3 is a rear view of the folded electric bicycle;

FIG. 4 is a side elevation of the folded electric bicycle;

DETAILED DESCRIPTION OF THE INVENTION

Figure 1:
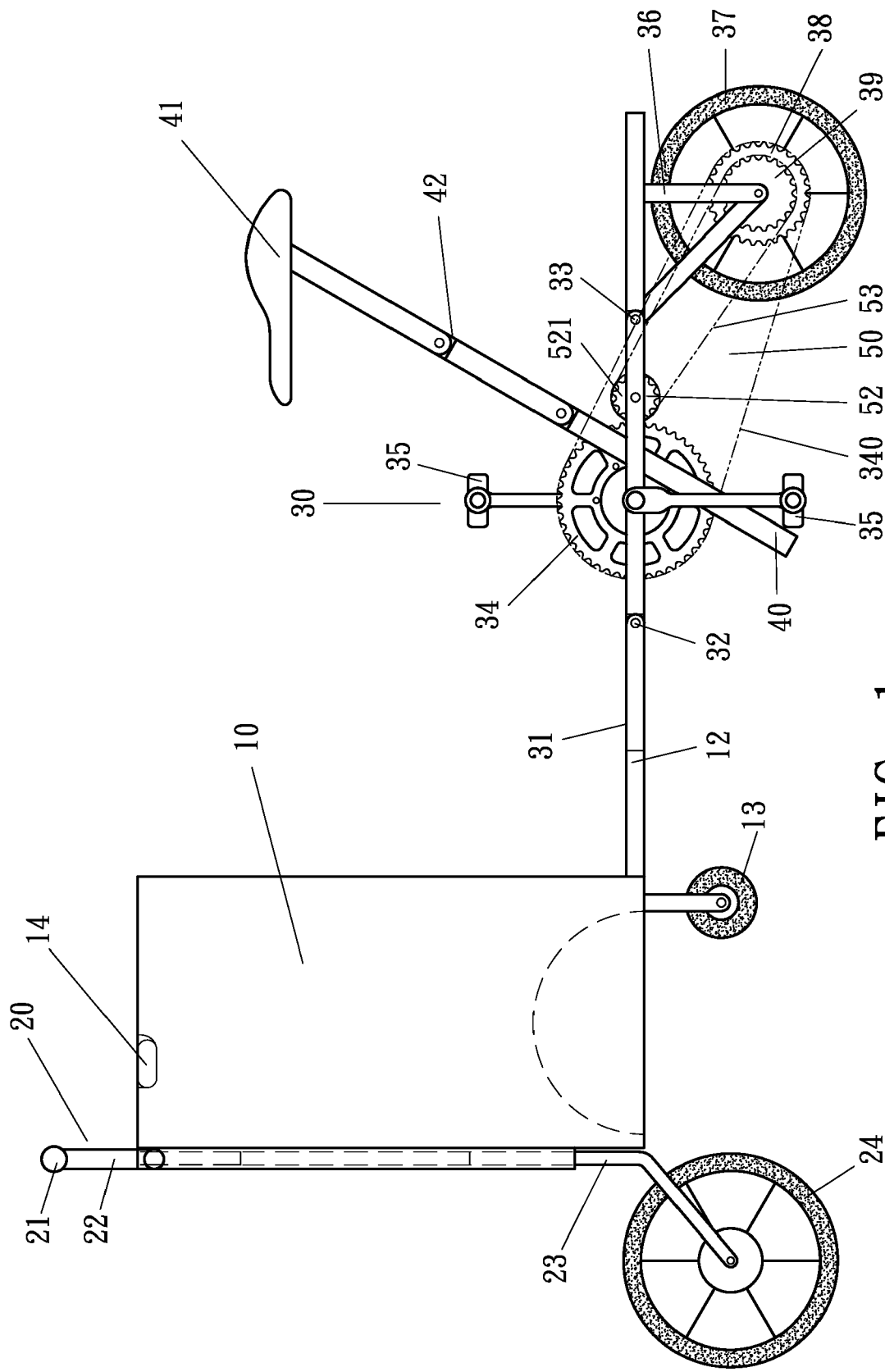
FIG. 1 is a side elevation of a first preferred embodiment of folding electric bicycle according to the invention.

Referring to FIGS. 1 to 6, a folding electric bicycle in accordance with a first preferred embodiment of the invention comprises the following components as discussed in detail below.

A case 10 of rectangular body has an open bottom. The case 10 comprises a hinged rear door 11, a foot rest 12 slidably extending rearward from the bottom, two widthwise spaced auxiliary wheels 13 mounted on two rear bottom corners respectively, and a lifting handle 14 on the top.

A front manipulation assembly 20 comprises a head tube 22 pivotably provided on the top center of a front end of the case 10, two handlebars 21 on the top end of the head tube 22, a swivel fork 23 slidably connected to the lower end of the head tube 22, and a front wheel 24 rotatably mounted to the lower end of the fork 23.

A drive mechanism 30 comprises a frame 31 including front, intermediate, and rear sections in which the front and intermediate sections are connected together by a first pivot 32 and the intermediate and rear sections are connected together by a second pivot 33, a front chain wheel 34 rotatably provided between the first and second pivots 32, 33, left and right pedals 35 connected to the hub of the front chain wheel 34, a rear bracket 36 for carrier, a rear wheel 37 rotatably connected to the rear bracket 36, coaxial first and second rear chain wheels 38, 39 rotatably connected to the hub of the rear wheel 37, and a main drive chain 340 rotatably fitted around the front chain wheel 34 and the first rear chain wheel 38.

A brake (not shown) is provided to control the rotation of both the front and rear wheels 24, 37.

A seat tube 40 is secured to the frame 31 and is provided between the first pivot 32 and the rear bracket 36. A seat post 42 is extended obliquely downward from a seat 41 to telescopically connect to the seat tube 40.

A power unit 50 comprises a battery pack 51 provided in the case 10, a motor assembly 52 provided in the intermediate section of the frame 31 and including an electric motor 520 powered by the battery pack 51 to rotate the rear wheel 37, and a driven wheel 521 operatively connected to a driving shaft (not shown) of the electric motor 520, and an auxiliary drive chain 53 rotatably fitted around the driven wheel 521 and the second rear chain wheel 39. Note that the auxiliary drive chain 53 may be eliminated in other embodiments. That is, the second rear chain wheel 39 is in gear mesh with the driven wheel 521.

Figure 2:
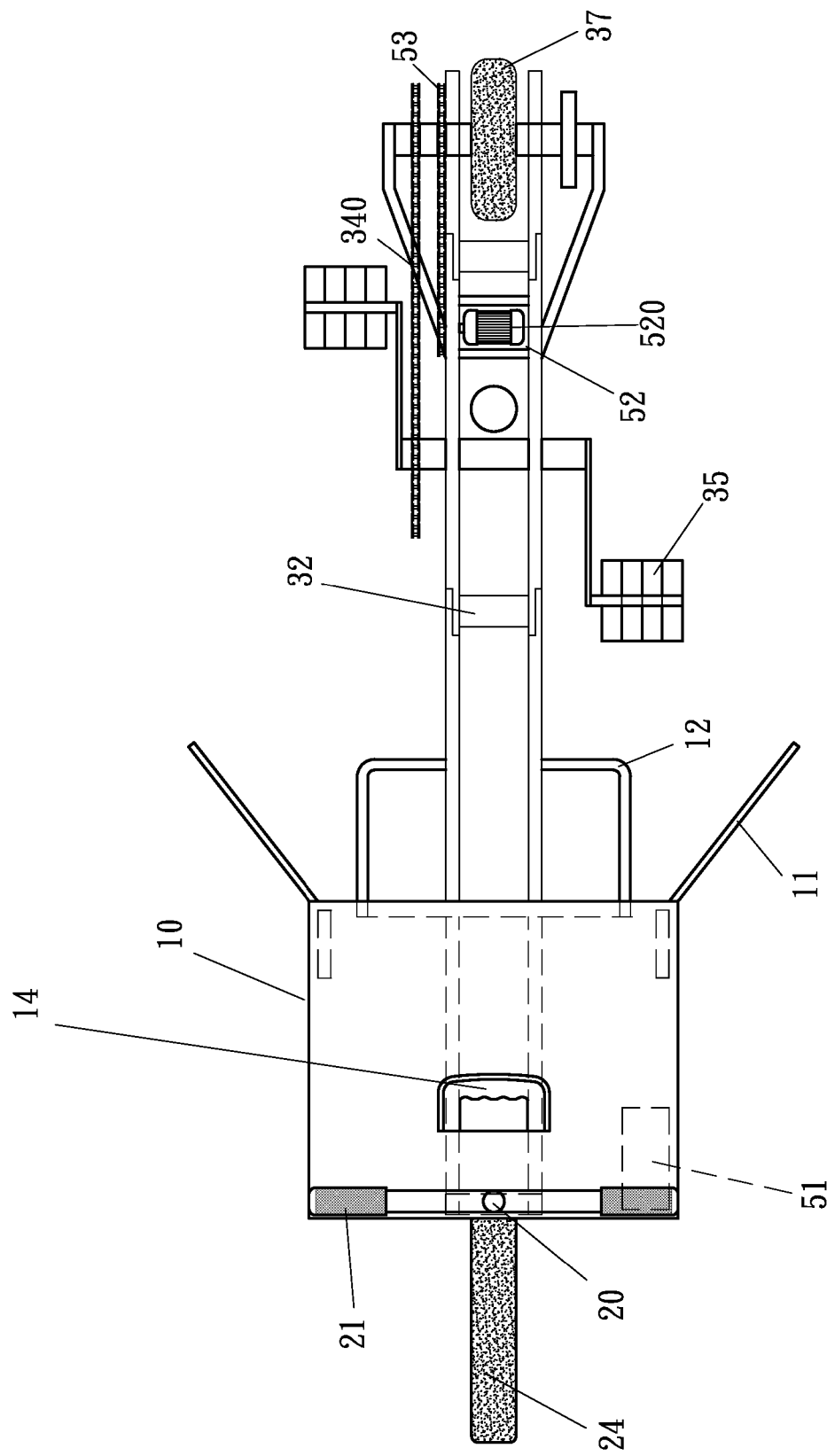
FIG. 2 is a top view of FIG. 1 with the seat and the seat tube removed.

As shown in FIGS. 1 and 2 specifically, a driver may rest both feet on the pedals 35 and pedal same to rotate the front chain wheel 34. And in turn, both the first rear chain wheel 38 and the rear wheel 37 rotate sequentially to propel the electric bicycle. Also, the driver may manipulate the handlebars 21 to control the direction of the front wheel 24 via the head tube 22 and the fork 23.

For collapsing the electric bicycle, a driver may detach the seat post 42 from the seat tube 40. Next, slide the foot rest 12 into the bottom of the case 10. Next, fold the frame 31 by pivoting the first and second pivots 32, 33. Next, the folded frame 31, the seat tube 40, and the rear wheel 37 are placed in the case 10 (see FIGS. 3 and 4).

Figure 6:
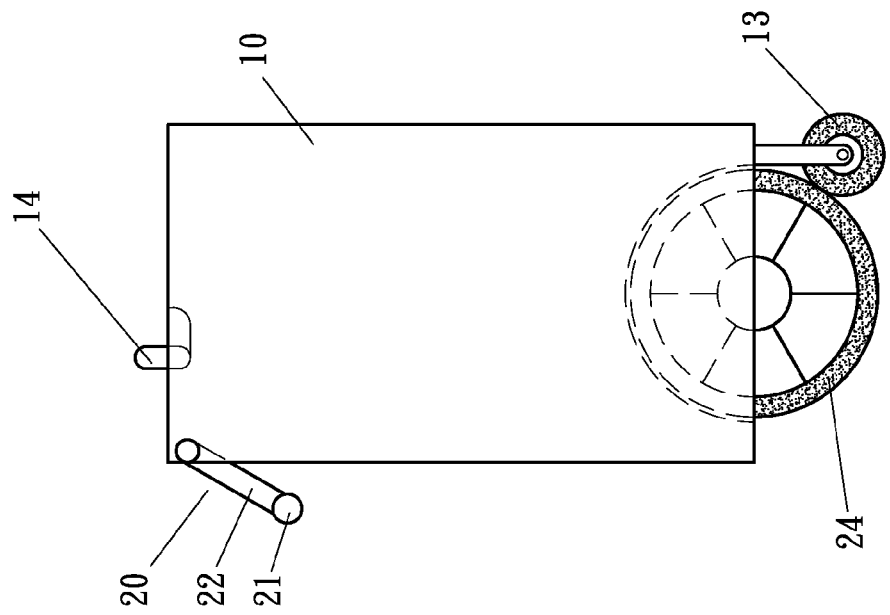
FIGS. 5 and 6 are side elevations showing the folding operation of the front wheel.
Figure 5:
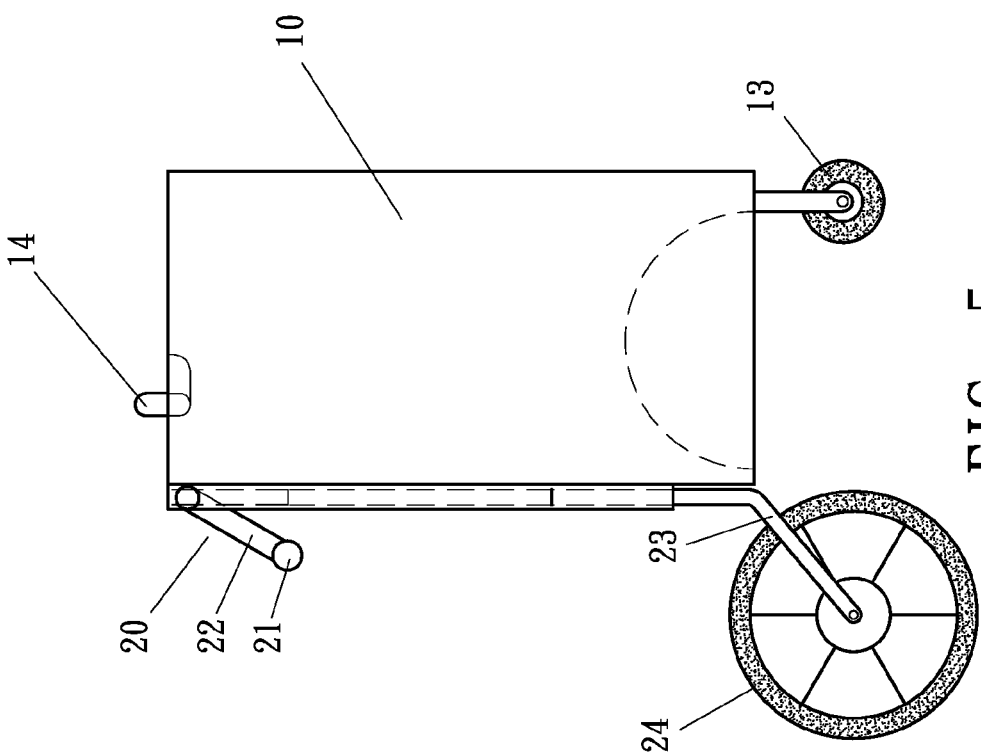

Next, as shown in FIGS. 5 and 6, turn the fork 23 about 180 degrees to move the front wheel 24 to be close to the auxiliary wheels 13. Next, push the front wheel 24 partially into the case 10 until the front wheel 24 is disposed in place. At this position, the front wheel 24 is flush with the auxiliary wheels 13. Finally, close the door 11. Hence, the driver may hold the handlebars 21 to push or pull the electric bicycle by wheeling in a labor saving manner. Alternatively, the driver may lift the folded electric bicycle by holding and lifting the lifting handle 14.

Figure 7:
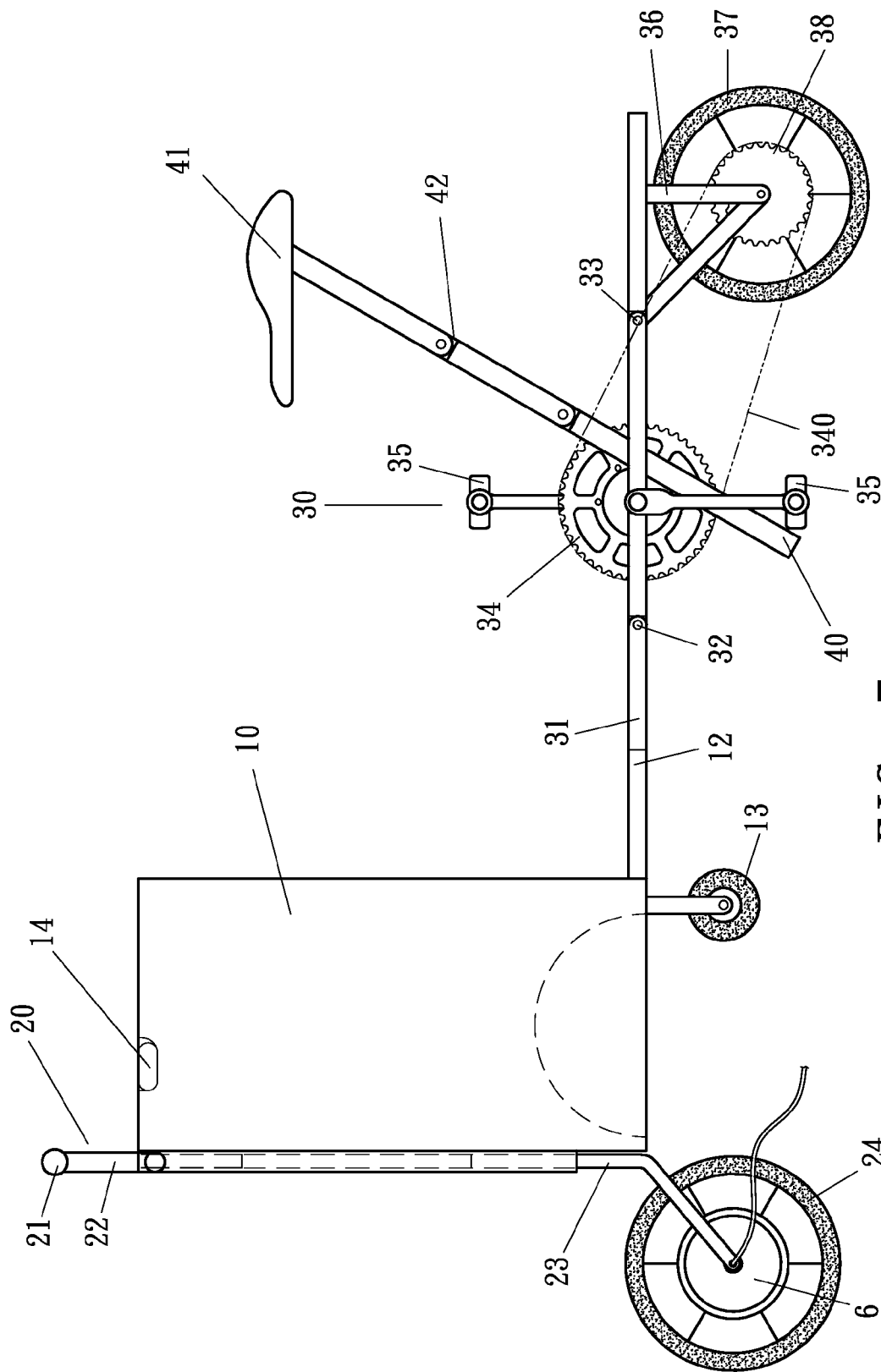
FIG. 7 is a side elevation of a second preferred embodiment of folding electric bicycle according to the invention.

Referring to FIG. 7, a folding electric bicycle in accordance with a second preferred embodiment of the invention is shown. The characteristics of the second preferred embodiment are detailed below. The power unit (not shown) comprises a battery pack 51 provided in the case 10, and an electric motor 6 powered by the battery pack 51 for rotating the front wheel 24. In other words, components such as driven wheel 521, auxiliary drive chain 53, and second rear chain wheel 39 shown in the first preferred embodiment are eliminated.

While the invention herein disclosed has been described by means of specific embodiments, numerous modifications and variations could be made thereto by those skilled in the art without departing from the scope and spirit of the invention set forth in the claims.

What is claimed is:

1. A folding electric bicycle comprising:
    a case having an open bottom and comprising a rear door and two widthwise spaced auxiliary wheels mounted proximate the rear end of the bottom;
    a manipulation assembly comprising a pivotal head tube disposed on the front end of the case, two handlebars disposed on the top end of the head tube, a swivel fork telescopically connected to the head tube, and a front wheel rotatably mounted to the fork;

a drive mechanism comprising a folding frame, a front chain wheel, left and right pedals connected to the front chain wheel, a rear bracket, a rear wheel rotatably connected to the rear bracket, first and second rear chain wheels coaxially connected to the rear wheel, and a main drive chain rotatably fitted around the front chain wheel and the first rear chain wheel;

a brake;

a seat tube secured to the frame;

a seat post slidably secured to the seat tube;

a seat disposed on the seat post; and power means secured to the folding frame and comprising a battery pack, a motor assembly including an electric motor powered by the battery pack to rotate the rear wheel, and a driven wheel operatively connected to both the electric motor and the second rear chain wheel, whereby for collapsing the folding electric bicycle, a driver detaches the seat post from the seat tube, folds the folding frame, places the folded folding frame, the seat tube, and the rear wheel in the case, turns the front wheel to be close to the auxiliary wheels, pushes the front wheel partially into the case until the front wheel is disposed in place, and closes the door.

2. The folding electric bicycle of claim 1, further comprising a lifting handle disposed on the top of the case.

3. The folding electric bicycle of claim 1, further comprising a foot rest slidably extending rearward from the bottom of the case.

4. The folding electric bicycle of claim 1, wherein the folding frame comprises a front section, an intermediate section, a rear section, a first pivot for pivotably connecting the front and intermediate sections together, and a second pivot for pivotably connecting the intermediate and rear sections together.

5. The folding electric bicycle of claim 1, wherein the battery pack is disposed in the case.

6. The folding electric bicycle of claim 1, further comprising an auxiliary drive chain rotatably fitted around the driven wheel and the second rear chain wheel.

7. The folding electric bicycle of claim 1, wherein the second rear chain wheel is in gear mesh with the driven wheel.

* * * * *